United States Patent [19]
Wikström

[11] Patent Number: 6,157,712
[45] Date of Patent: Dec. 5, 2000

[54] SPEECH IMMUNITY ENHANCEMENT IN LINEAR PREDICTION BASED DTMF DETECTOR

[75] Inventor: Per Magnus Wikström, Sollentuna, Sweden

[73] Assignee: Telefonaktiebolaget LM Ericsson, Stockholm, Sweden

[21] Appl. No.: 09/017,798

[22] Filed: Feb. 3, 1998

[51] Int. Cl.[7] .................................................... H04M 1/50
[52] U.S. Cl. ........................... 379/386; 379/283; 704/219
[58] Field of Search ................................... 379/386, 283, 379/339; 704/219

[56] References Cited

U.S. PATENT DOCUMENTS

| | | | |
|---|---|---|---|
| 4,412,299 | 10/1983 | Huffman | 702/72 |
| 4,689,760 | 8/1987 | Lee et al. . | |
| 4,853,958 | 8/1989 | Rabipour et al. . | |
| 5,070,526 | 12/1991 | Richmond et al. . | |
| 5,119,322 | 6/1992 | Stroobach . | |
| 5,257,309 | 10/1993 | Brandman et al. . | |
| 5,450,484 | 9/1995 | Hamilton . | |
| 5,495,526 | 2/1996 | Cesaro et al. . | |
| 5,519,774 | 5/1996 | Battista et al. . | |
| 5,528,663 | 6/1996 | Locke et al. | 379/31 |
| 5,533,118 | 7/1996 | Cesaro et al. . | |
| 5,588,052 | 12/1996 | Murata et al. . | |
| 5,619,564 | 4/1997 | Canniff et al. | 379/386 |
| 5,619,565 | 4/1997 | Cesaro et al. . | |
| 5,675,639 | 10/1997 | Itani . | |
| 5,737,407 | 4/1998 | Graumann | 379/389 |
| 5,818,929 | 10/1998 | Yaguchi | 379/418 |

FOREIGN PATENT DOCUMENTS

0579927 A2  1/1994  European Pat. Off. .

OTHER PUBLICATIONS

"Application Note: Linear Prediction Based DTMF Detection for the WE DSP32 Digital Signal Processor Family", published by AT&T.

Anders Johansson et al., "Modellorienterad Signalbehandling", Institutionen för Teletransmissionsteori, KTH, Sep. 1985, pp. 14–15, 18–23 and 2 pages of reference.

*Primary Examiner*—David R. Hudspeth
*Assistant Examiner*—Abul K. Azad
*Attorney, Agent, or Firm*—Burns, Doane, Swecker & Mathis, L.L.P.

[57] ABSTRACT

To determine whether a received signal represents a dual tone multi frequency (DTMF) code, a characteristic of the received signal is repeatedly measured over a period of time, thereby obtaining a plurality of parameter measurements. This may include separating the received signal into low band and high band signals and for each of the low band and high band signals, determining a plurality of squared magnitude measurements over the period of time. A deviation value is then determined for each of the plurality of parameter measurements, and an average deviation value is determined from the plurality of deviation values. The average deviation value is compared to a threshold value, thereby obtaining a comparison result. The received signal as alternatively designated as representing or not representing a DTMF code on the basis of the comparison result. The step of determining a deviation value for each of the plurality of parameter measurements may include, for each of the plurality of squared magnitude measurements, determining a deviation from a predefined (e.g., unit) circle only if the squared magnitude measurement is less than the radius of the predefined circle, and setting the deviation equal to zero for all other cases. The step of determining the average deviation value from the plurality of deviation values may include determining which of the plurality of deviation values is a maximum deviation value, and determining an average deviation value from the plurality of deviation values not including the maximum deviation value.

12 Claims, 7 Drawing Sheets

SPEECH IMMUNITY ENHANCEMENT IN LINEAR PREDICTION BASED DTMF DETECTOR

BACKGROUND

The present invention relates to DTMF code detection, and more particularly, to methods and apparatuses for reducing the false detection probability on speech signals.

Dual Tone Multi-Frequency (DTMF) signaling is a standardized technique for communicating information in telecommunications systems. The DTMF code signaling method uses sixteen different codes. A DTMF code is a pulse that is the sum of two sine waves, one of which has a frequency that is selected from a low band frequency group, and the second of which has a frequency that is selected from a high band frequency group. In practice, the low band frequency group comprises the frequencies 697, 770, 852 and 941 Hz, while the high band frequency group comprises the frequencies 1209, 1336, 1477 and 1633 Hz. The pulse is either preceded or followed by a pause such that the duration of both pulse and pause exceeds specified limits.

A DTMF detector is a component that receives a signal, and determines whether that signal is a DTMF signal. Such a device is necessary because DTMF signals are usually transmitted on communications lines that transmit other types of signals as well, such as voice signals. A well-known problem in the art of DTMF detection is providing high speech immunity, that is, keeping the probability that a speech signal will falsely be identified as a DTMF signal low.

A known method of detecting DTMF codes based on linear predictive analysis is described in "Application Note: Linear Prediction Based DTMF Detection for the WE DSP32 Digital Signal Processor Family" published by AT&T. According to this prior art method, the DTMF pulse is assumed to have been produced by the signal model shown in FIG. 1(a). White noise from two independent random sources, $\eta_{1n}$ and $\eta_{2n}$, is used to excite respective first and second filters 101, 103. The first filter 101 operates in accordance with $$\frac{1}{A(z)} = \frac{1}{1 - a_1 z^{-1} - a_2 z^{-2}}.$$

Figure 1A:
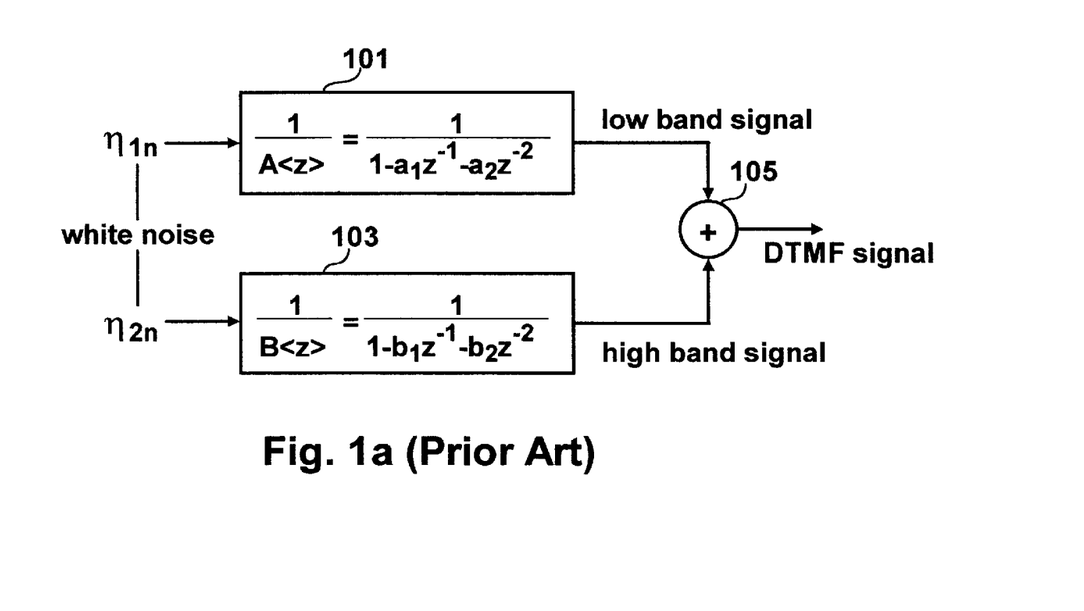

Similarly, the second filter 103 operates in accordance with $$\frac{1}{B(z)} = \frac{1}{1 - b_1 z^{-1} - b_2 z^{-2}}.$$

Each of these filters has a set of complex conjugate poles on the unit circle of the Z-plane with angles respectively corresponding to the low and high tone frequency. The outputs from the first and second filters 101, 103 are summed, in combining means 105, to generate the DTMF signal. Because each of the first and second filters 101, 103 is an all pole filter of second order, each output signal is an Auto Regressive process of order 2 (henceforth, "an AR(2) process". See Johansson and Forsen, "Modellorienterad Signalbehandling", Institutionen for Teletransmissionsteori, KTH, September 1985.

In the theory of AR-processes, the filter coefficients of A(z) and B(z) can be estimated on the basis of autocorrelation function (acf) values of the respective low band and high band signals using the Yule-Walker normal equations. Filters are used to separate the received DTMF signal into low band and high band signals. The low and high band signals are each sampled at 4 kHz. Each of the low band and high band signals is then separately analyzed using the formulas set forth as follows:

In matrix notation, the normal equation is:

$$Ra = r \qquad (1)$$

where R is a 2×2 matrix with acf-values as follows:

$$R = \begin{bmatrix} r_y(1,1) & r_y(1,2) \\ r_y(2,1) & r_y(2,2) \end{bmatrix} \qquad (2)$$

where $r_y(l,m) = E[s_{n-l}, s_{n-m}]$. $E[\ldots]$ denotes the expectation value. In equation (2), the relationship $r_y(2,1) = r_y(1,2)$ exists.

In equation (1), the variable a is a 2-element column vector with the AR-coefficients. For the first filter 101, the vector for A(z) is $$a = \begin{bmatrix} a_1 \\ a_2 \end{bmatrix} \qquad (3)$$

The variable r in equation (1) is 2-element column vector with acf-values of:

$$r = \begin{bmatrix} r_y(0,1) \\ r_y(0,2) \end{bmatrix} \qquad (4)$$

The acf-values may be estimated by a number of techniques. One possibility is by using the recursion formulas:

$$R = \lambda R + y_{n-1} y_{n-1}^T \qquad (5)$$

$$r = \lambda r + s_n y_{n-1} + tm \qquad (6)$$

where $s_n$ is the present sample and $\lambda$ is the forgetting factor, which is a number slightly less than one, and $y_n = [s_n, s_{n-1}]^T$. For A(z), $s_n$ is the present sample in the low band signal.

The roots of the filter $A(z) = 1 - a_1 z^{-1} - a_2 z^{-2}$ are given by:

$$z = \frac{\left[ a_1 \pm \sqrt{(a_1^2 + 4a_2)} \right]}{2} \qquad (7)$$

For these roots to form a complex conjugate pair corresponding to a sinusoid of non-zero frequency, $a_2$ must be negative with magnitude greater than $a_1^2/4$. Therefore, equation (7) can be expressed as:

$$z = \frac{\left[ a_1 \pm j\sqrt{-(a_1^2 + 4a_2)} \right]}{2} \qquad (8)$$

The magnitude of z is:

$$|z| = \sqrt{-a_2} \qquad (9)$$

and the angle in the upper half of the z-plane is $$\theta = \tan^{-1}\left[\frac{\sqrt{-(a_1^2 + 4a_2)}}{a_1}\right] \quad (10)$$

Figure 1B:
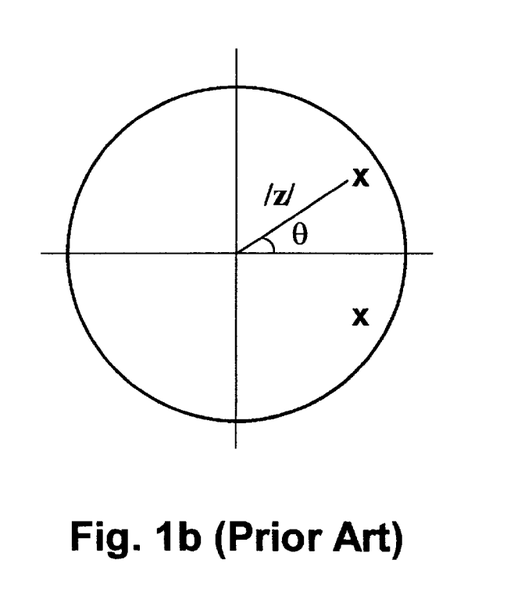

FIG. 1(b) illustrates the pole locations (denoted by "x") of the filter 1/A(z) in the z-plane.

Solving the normal equations for the vector a of equation (3), it is found that $$a_1 = \frac{\alpha_1}{(detR)} \quad (11)$$

and $$a_2 = \frac{\alpha_2}{(detR)} \quad (12)$$

where $$detR = r_y(1,1)r_y(2,2) - r_y(1,2)^2 \quad (13)$$

is the determinant of R, $$\alpha_1 = r_y(0,1)r_y(2,2) - r_y(1,2)r_y(0,2) \quad (14)$$

and $$\alpha_2 = r_y(1,1)r_y(0,2) - r_y(1,2)r_y(0,1) \quad (15)$$

For each DTMF frequency, the detector should accept θ within the range $$\theta_{fjL} < \theta < \theta_{fjH} \quad (16)$$

as valid, where $\theta_{fjL}$ is the low frequency threshold and $\theta_{fjH}$ is the high frequency threshold of DTMF frequency j. It is noted that these threshold values are application-specific. They depend on the deviation from the nominal DTMF frequency that is to be accepted as a DTMF signal.

Applying the relationships of equations (11), (12) and (13) to equation (10), the acceptance criterion of equation (16) can be rewritten as $$(\sqrt{(1+\tan^2\theta_{f+di\,jL})}a_1)^2 + 4detRa_2 \leq 0 \leq (\sqrt{(1+\tan^2\theta_{f+di\,jH})}a_1)^2 + 4detRa_2 \quad (17)$$

for the low band frequencies 0 to 1000 Hz.

For the high band signal, the vector a is written $$a = \begin{bmatrix} b_1 \\ b_2 \end{bmatrix} \quad (18)$$

and with this change, the acceptance criterion is $$(\sqrt{(1+\tan^2\theta_{f+di\,jL})}a_1)^2 + 4detRa_2 \geq 0 \geq (\sqrt{(1+\tan^2\theta_{f+di\,jH})}a_1)^2 + 4detRa_2 \quad (19)$$

for the high band frequencies, 1000 to 2000 Hz. It is noted that the acceptance criteria shown in equations (17) and (19) are preferred formulations. However, they may alternatively be formulated in other ways, such as that which is illustrated in the above-referenced AT&T publication.

If a DTMF pulse is present, the polynomials A(z) and B(z) will have roots close to the unit circle at angles corresponding to DTMF frequencies in both the low and high bands. One of the principles upon which the detector is based is that if speech is present, it is unlikely that the roots are close to the unit circle at angles corresponding to DTMF frequencies in both the low and high bands simultaneously. The fact that the roots are expected to be close to the unit circle can be utilized to enhance the speech immunity of the detector.

Using equations (9) and (12), the magnitude M can be written as $$M^2 = -\frac{\alpha^2}{(detR)} \quad (20)$$

With a minimum acceptable squared magnitude threshold, designated $M_{thresh}^2$, the requirement for acceptance can be written:

$$a_2 + detR\, M_{thresh}^2 < 0 \quad (21)$$

It is noted that the value of the squared magnitude threshold, $M_{thresh}^2$, may be set individually for each DTMF frequency, just as it is with the frequency thresholds. In an alternative embodiment, it is, of course, also possible to calculate the magnitude, M, itself and compare that to a corresponding threshold, but that is a very inefficient way to do it.

The detection method divides the low and high band signal into frames where each frame is T ms. Autocorrelation function (acf) values are calculated for each frame. At the end of each frame, a linear predictive analysis is performed on the basis of the acf values.

The detector is based on results from the linear predictive analysis over a sequence of frames. To identify the pulse part, the magnitude and the frequency need to pass the acceptance criteria formulated in expressions (17), (19) and (20). To approve a DTMF code, at least P number of frames indicating the same DTMF pulse needs to be received, where P depends on the frame length T and on the minimum pulse length that is to be detected. There are also requirements on the pause part in the signaling but a discussion of this requirement is not relevant in the following discussion.

A system has been tested in which the input signal was separated into low and high band signals (sampled at 4 kHz) by means of digital filtering, and in which the above-described analysis was applied to each of the resultant low and high band signals. The frame length in this test system was 9 ms.

It was discovered through testing that the squared magnitude measurements over a DTMF pulse part often results in one of the frames having a squared magnitude that deviates much more from the unit circle than the other frames. This fact must be taken into consideration when defining the acceptance criteria for the squared magnitude, and results in a magnitude threshold that is less exacting. Consequently, the false detection probability on speech signals is increased.

SUMMARY

It is therefore an object of the present invention to provide methods and apparatus for detecting DTMF signals with an improved false detection probability.

In accordance with one aspect of the present invention, the foregoing and other objects are achieved in methods and apparatuses for determining whether a received signal represents a dual tone multi frequency (DTMF) code by repeatedly measuring a characteristic of the received signal over a period of time, thereby obtaining a plurality of parameter measurements. A deviation value for each of the plurality of parameter measurements is determined. Then, an average deviation value is determined from the plurality of deviation values. The average deviation value is compared to a threshold value, thereby obtaining a comparison result. The received signal is designated as alternatively representing or not representing a DTMF code on the basis of the comparison result.

In one aspect of the invention, repeatedly measuring the characteristic of the received signal over a period of time, thereby obtaining a plurality of parameter measurements, includes separating the received signal into low band and high band signals; and for each of the low band and high band signals, determining a plurality of squared magnitude measurements over the period of time, wherein each squared magnitude measurement corresponds to a distance between an origin and a z-plane pole of an all-pole filter.

In yet another aspect of the invention, determining a deviation value for each of the plurality of parameter measurements includes determining a deviation from a predefined circle for each of the plurality of squared magnitude measurements only if the squared magnitude measurement is less than the radius of the predefined circle, and setting the deviation equal to zero for all other cases.

In still another aspect of the invention, the predefined circle is a unit circle.

In yet another aspect of the invention, determining the deviation from the predefined circle for each of the plurality of squared magnitude measurements only if the squared magnitude measurement is less than the radius of the predefined circle, and setting the deviation equal to zero for all other cases includes, for each of the plurality of squared magnitude measurements, setting a corresponding one of a plurality of adjusted magnitude measurements equal to the squared magnitude measurement if the squared magnitude measurement is less than the radius of the predefined circle, and otherwise setting the corresponding one of the plurality of adjusted magnitude measurements equal to the radius of the predefined circle; and for each of the plurality of adjusted magnitude measurements, determining the deviation of the adjusted magnitude measurement from the predefined circle.

In still another aspect of the invention, determining the average deviation value from the plurality of deviation values includes determining which of the plurality of deviation values is a maximum deviation value; and determining an average deviation value from the plurality of deviation values not including the maximum deviation value.

In yet another aspect of the invention, repeatedly measuring the characteristic of the received signal over a period of time, thereby obtaining a plurality of parameter measurements, includes separating the received signal into low band and high band signals; and for each of the low band and high band signals, determining a plurality of frequency measurements over the period of time.

In still another aspect of the invention, determining a deviation value for each of the plurality of parameter measurements includes determining a standard deviation for each of the plurality of frequency measurements, wherein the standard deviation is measured relative to a mean value of the measured frequencies.

BRIEF DESCRIPTION OF THE DRAWINGS

The objects and advantages of the invention will be understood by reading the following detailed description in conjunction with the drawings in which:

FIG. 1($a$) is a block diagram of a prior art signal model for generating a DTMF pulse, and FIG. 1($b$) shows the z-plane pole locations of one of the filters in the prior art signal model;

DETAILED DESCRIPTION

The various features of the invention will now be described with respect to the figures, in which like parts are identified with the same reference characters.

A principle upon which the invention is based is to significantly reduce the false detection probability on speech signals by measuring an average deviation of some parameter derived from the received signal, and to compare this average deviation to a threshold value. The pulse is either approved or rejected on the basis of this comparison.

Figure 2:
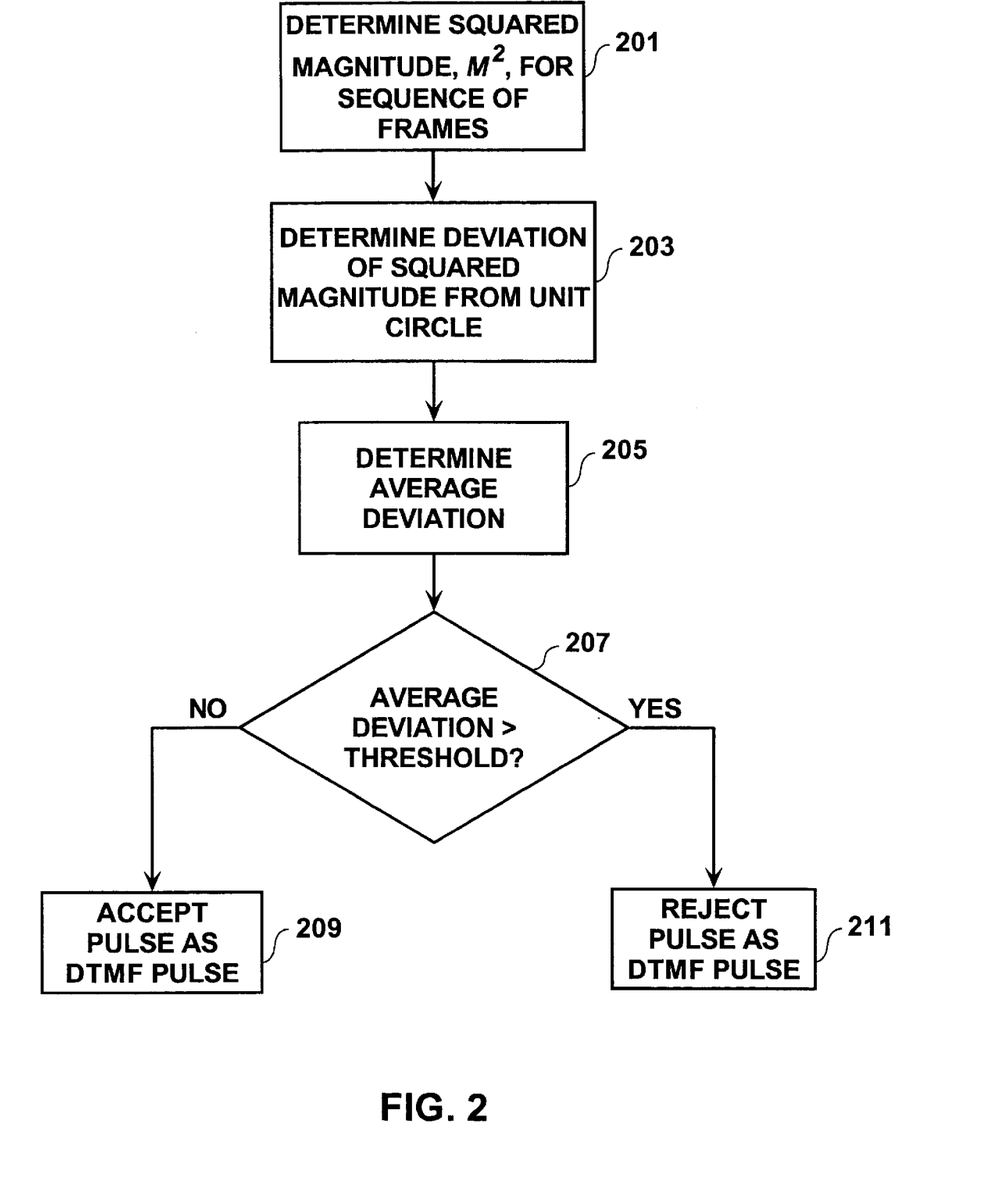
FIG. 2 is a flowchart of a technique for determining whether a received signal is a DTMF pulse, in accordance with one aspect of the invention.

In one embodiment, illustrated in the flowchart of FIG. 2, a sequence of frames indicating a DTMF pulse is tested. A DTMF pulse is indicated for any frame if both the low band and the high band signal passes a frequency and magnitude test according to equations (17) and (21). When a sequence of frames indicates the same low and high band DTMF frequencies, the squared magnitude for the sequence of frames is determined (step 201), and the deviation of each squared magnitude from a unit circle is determined (step 203). From the set of deviations, an average deviation from the unit circle is determined (step 205). The average deviation is then compared to a threshold value (decision block 207), and the pulse is either accepted (step 209) or rejected (step 211) on the basis of the comparison.

Figure 3:
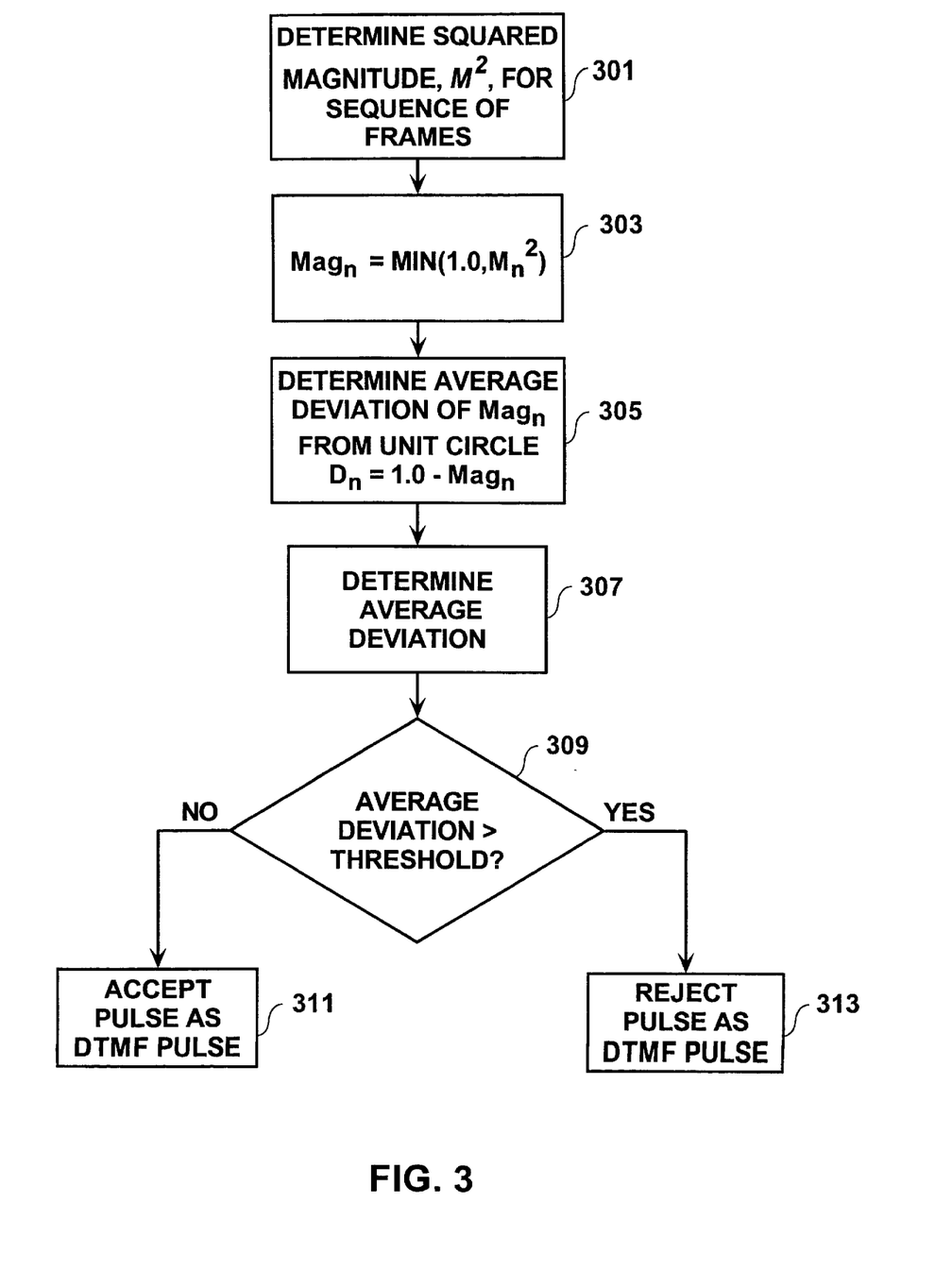
FIG. 3 is a flowchart of a technique for determining whether a received signal is a DTMF pulse, in accordance with one aspect of the invention that includes measuring deviation of a squared magnitude from a unit circle only if the squared magnitude is inside the unit circle.

In another aspect of the invention, the technique is refined by considering only those deviations derived from squared magnitudes that are inside the unit circle (i.e., squared magnitudes less than 1.0). This improves performance by lowering the reject ratio of real DTMF pulses. This is because, in the analysis of speech signals, it is rare that a squared magnitude above 1.0 is found. However, real DTMF pulses sometimes do result in a squared magnitude that is greater than 1.0. This embodiment is illustrated in the flowchart of FIG. 3. First, the squared magnitude for a sequence of frames indicating the same DTMF pulse is determined (step 301). Then, the squared magnitude for each frame is adjusted so that any values greater than 1.0 will be set equal to 1.0 (step 303). Any squared magnitude values less than 1.0 are left alone. This is represented mathematically by equation (22):

$$Mag_n = min(1.0, M_n^2) \qquad (22)$$

Using the adjusted squared magnitude values (i.e., $Mag_n$), the deviation of each squared magnitude from a unit circle is determined (step 305) by, for example, calculating $D_n = 1.0 - Mag_n$ for each frame. From the set of deviations, an average deviation from the unit circle is determined (step 307). The average deviation is then compared to a threshold value (decision block 309), and the pulse is either accepted (step 311) or rejected (step 313) on the basis of the comparison.

Those having ordinary skill in the art will recognize that the "adjustment" technique (step 303) is merely one way for ensuring that only those deviations derived from squared magnitudes that are inside the unit circle are considered, and that alternative techniques may be utilized with equal results. For example, the squared magnitude values could be left alone, the deviations determined for all squared magnitude values, and the sign of the resultant deviation used to determine which ones to consider and which ones to eliminate from consideration.

Figure 4:
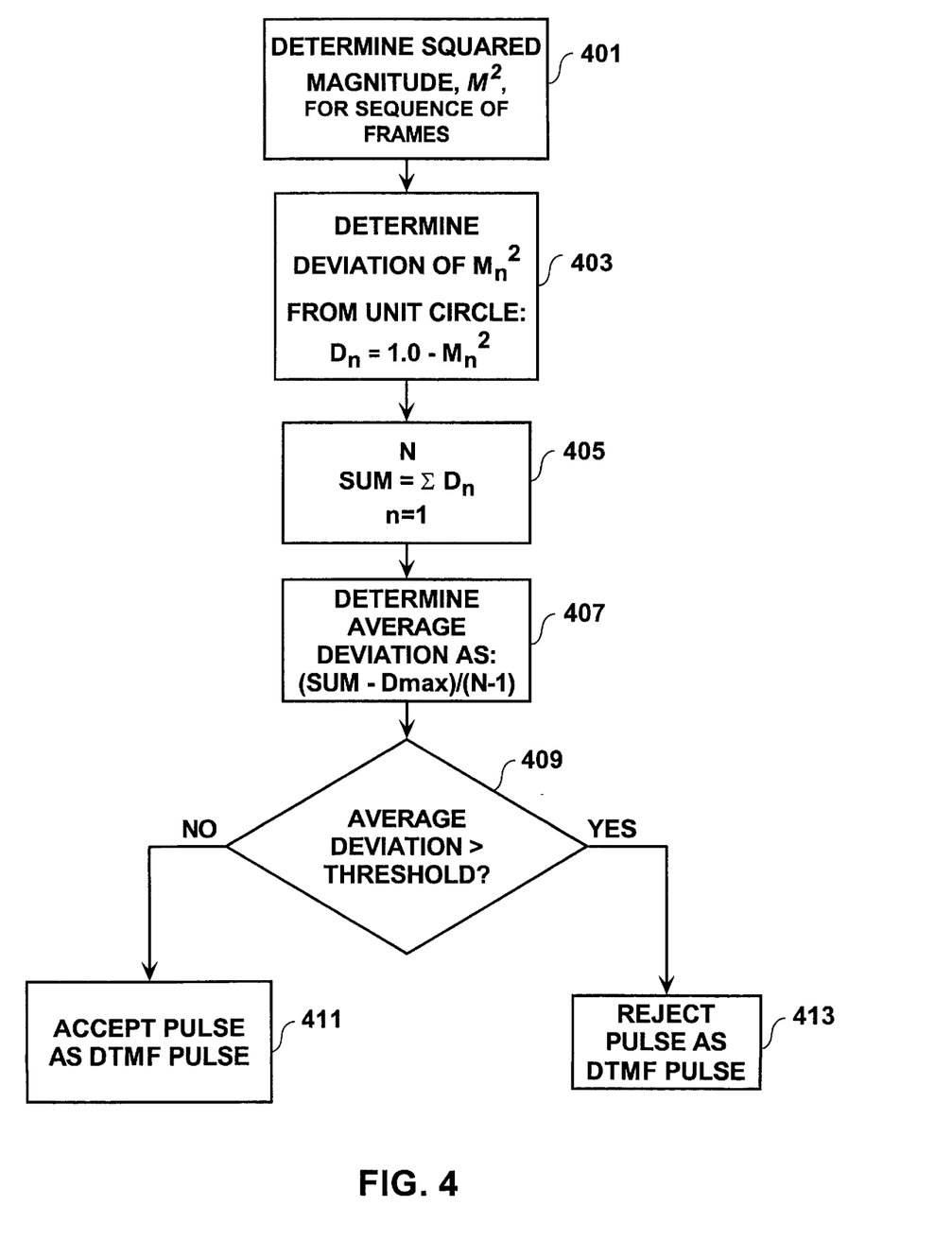
FIG. 4 is a flowchart of a technique for determining whether a received signal is a DTMF pulse, in accordance with one aspect of the invention that includes eliminating the effect of a maximum deviation on an average deviation value.

In yet another aspect of the invention, the technique is refined by determining which of the measured deviations is the maximum deviation in a sequence of frames. The maximum deviation is then eliminated from consideration prior to determination of the average value. This further improves the ability to reject speech signals because, in a sequence of frames containing a real DTMF pulse, it is quite usual that the squared magnitude value of one of these frames will deviate much more than others. By contrast, this relation is not generally observed in sequences of frames containing speech signals. Therefore, excluding the maximum deviation has the effect of lowering the average deviation threshold, thereby increasing speech immunity, without decreasing the detector performance. An embodiment employing this refinement is illustrated in FIG. 4. First, the squared magnitude for a sequence of frames indicating the same DTMF pulse is determined (step 401). Then, the deviation of each squared magnitude from a unit circle is determined (step 403) by, for example, calculating $D_n = 1.0 -$ $M_n^2$ for each frame. From the set of deviations not including the maximum deviation, an average deviation from the unit circle is determined. In particular, this may be performed by determining a sum of all deviations (step 405). Mathematically, this is expressed as:

$$SUM = \sum_{n=1}^{N} D_n \qquad (23)$$

The maximum deviation over the N frames is $$D_{max} = max(D_n) \qquad (24)$$

where n=1, 2, . . . , N (N being the number of frames indicating the same DTMF pulse).

The average deviation is then determined by subtracting out the maximum deviation, $D_{max}$ and dividing by the number of deviations minus one (step 407). This is represented mathematically as:

$$\text{Average Deviation} = \frac{(SUM - D_{max})}{(N-1)} \qquad (25)$$

The average deviation is then compared to a threshold value, $D_{lim}$ (decision block 409), and the pulse is either accepted (step 411) or rejected (step 413) on the basis of the comparison. In particular, if the magnitude of the average deviation is greater than the threshold value, $D_{lim}$, then the pulse is not considered as a DTMF pulse, and is therefore rejected.

Those having ordinary skill in the art will recognize that the illustrated technique for determining the average deviation not including the maximum deviation (steps 405 and 407) is merely one way of performing this task, and that alternative techniques may be utilized with equal results. For example, rather than summing all of the deviations (step 405) and then subtracting out the maximum (step 407), one might alternatively examine all of the deviations to determine which is the maximum, and then simply sum all of the deviations except for the maximum value. This sum would then be divided by the number of deviations minus one, in order to arrive at a suitable average value.

It is further noted that, in the embodiment described above, the average deviation threshold is the same for all DTMF frequencies. However, in alternative embodiments, different average deviation thresholds may be used for each DTMF frequency.

Figure 5:
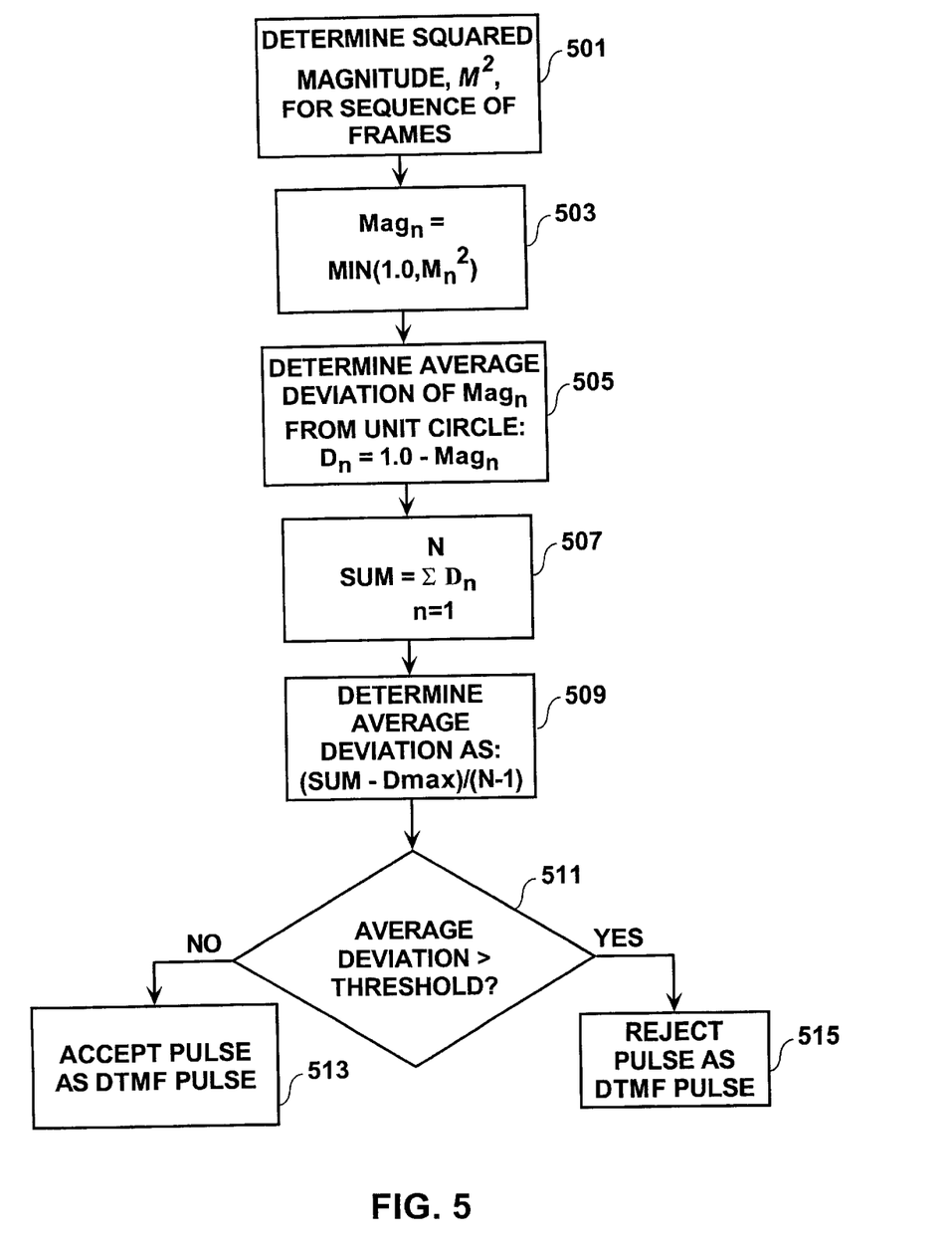
FIG. 5 is a flowchart of a techniques for determining whether a received signal is a DTMF pulse, in accordance with one aspect of the invention that includes both measuring deviation of a squared magnitude from a unit circle only if the squared magnitude is inside the unit circle and eliminating the effect of a maximum deviation on an average deviation value.

In yet another embodiment, the two refinements described above may be combined, as shown in the flowchart of FIG. 5. The various steps here are essentially the same as those described above with respect to FIGS. 3 and 4, and therefore do not need to be described in great detail here. It can be seen that in step 503, each squared magnitude value is "capped" so that it cannot exceed a value of 1.0, thereby ensuring that squared magnitude values falling outside of the unit circle will produce a deviation from the unit circle equal to zero. In steps 507 and 509, all of the deviations, except for that which is determined to be the maximum deviation, are used to determine an average deviation value that is then compared to the threshold value to decide whether to accept (step 513) or reject (step 515) the pulse as a DTMF pulse.

Figure 6:
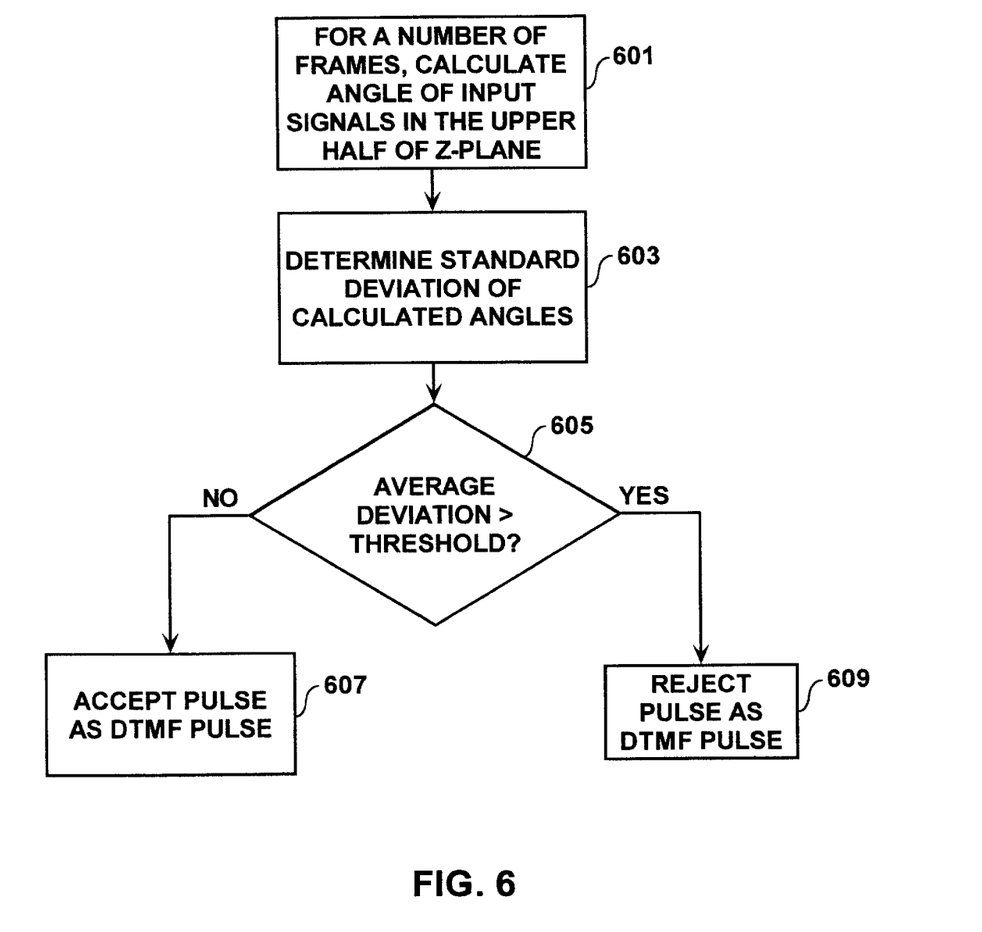
FIG. 6 is a flowchart of a technique for determining whether a received signal is a DTMF pulse, in accordance with one aspect of the invention that includes measuring the frequency of a received signal over time, and comparing the deviation of the measured frequency values to a threshold value.

The above-described embodiments operate by measuring an average deviation of a squared magnitude parameter that is derived from the received signal, and then comparing this average deviation to a threshold value. The pulse is either approved or rejected on the basis of this comparison. In an alternative embodiment of the invention, a frequency parameter is used instead of a squared magnitude parameter. More particularly, the "steadiness" of the frequency of the input signals (low and high band) is measured over a number of frames by, for example, calculating θ, as specified in equation (10), and only accepting a pulse as a DTMF pulse if the standard deviation divided by the average frequency of the input signals is small enough. An embodiment of this technique is illustrated in the flowchart of FIG. 6. At step 601, the angle of the input signals for a number of frames is calculated. As mentioned, this may be performed by calculating the angle θ in accordance with equation (10) for the low band signal. For the high band signal, the poles of the high band AR-model are located in the second quadrant of the z-plane, so equation (10) has to be slightly modified to be valid for this case. One having ordinary skill in the art would readily be able to make these modifications, based on the teachings set forth above with respect to the low band signal.

Next, the standard deviation of the calculated angles is determined (step 603). In particular, one first determines an average frequency, $\bar{\theta}$, in accordance with:

$$\bar{\theta} = \frac{\sum_{j=1}^{P} \theta_j}{P} \tag{26}$$

where P is the number of frame in the sequence. The standard deviation is then $$\sigma = \sqrt{\frac{\sum_{j=1}^{P} (\theta_j - \bar{\theta})^2}{(P-1)}} \tag{27}$$

Next, the standard deviation divided by the average frequency is compared to a threshold value (step 605). Mathematically, the condition for rejecting a signal as a DTMF signal is expressed $$\frac{\sigma}{\bar{\theta}} > THRESHOLD \tag{28}$$

If the standard deviation is greater than the threshold value, then the pulse is rejected as a DTMF pulse (step 609). Otherwise, it is accepted (step 607).

An appropriate threshold value may be determined empirically, or by measuring the standard deviation of the parameter θ on DTMF signals and defining the threshold in such a way that DTMF signals will not be rejected. The threshold value should be smaller than the frequency range that is used in equation (17). For example, if the detector is to accept, as a DTMF signal, all frequencies not deviating more than 2.5% from a nominal frequency according to equation (17), then the threshold value should be defined to be less than 0.025.

The theoretical basis for this embodiment is that the frequencies of a DTMF signal are probably more stable than the frequencies in a period of a speech signal. The implementation of this, however, is much more complicated than that of previously described embodiments because arc tangents and square roots have to be calculated.

Figure 7:
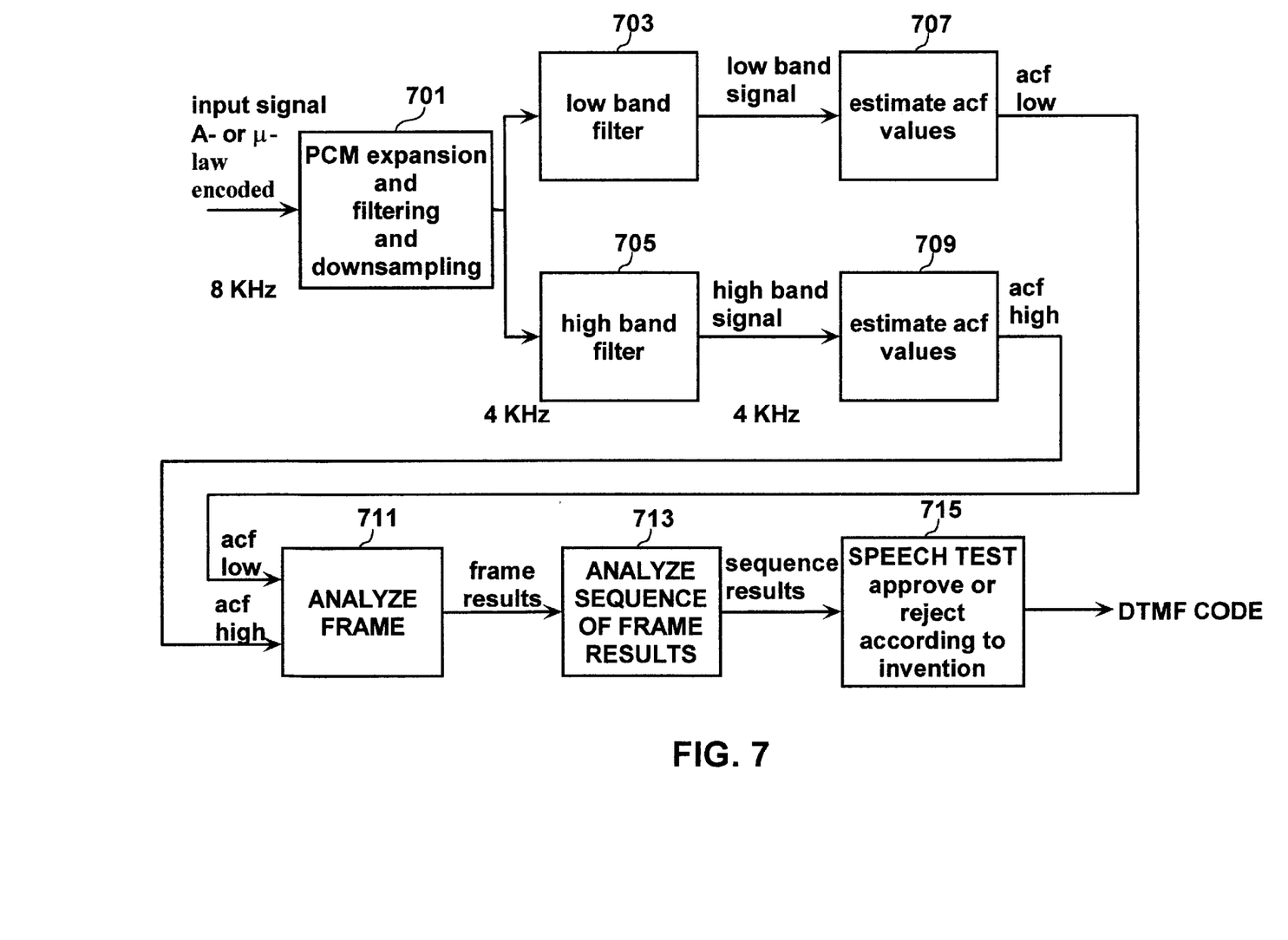
FIG. 7 is a block diagram of an exemplary embodiment of a DTMF detector in accordance with the invention.

An exemplary implementation of the invention is a microprocessor performing the functions illustrated in FIG. 7. Of course, alternative embodiments may include discrete hardware elements corresponding to one or more of the various blocks shown in FIG. 7. Looking now at the figure, an input signal is supplied to a PCM expansion and filtering and downsampling block 701. In this block, the input signal, which is either A- or m-law encoded, is first converted to a linear representation of the signal. This conversion process, which is called PCM expansion, is a well-known technique that need not be described here in detail. The linearized signal is then low-pass filtered to allow downsampling of the signal in a subsequent step without aliasing of frequencies above 2 kHz. The cutoff frequency for this filtering may be around 1.8 kHz and the attenuation in the stop band may be around 20 dB. Further in block 701, the filtered signal is downsampled by a factor of 2, resulting in an output signal that is sampled at 4 kHz, assuming an input signal that was sampled at an 8 kHz sampling rate.

It should be noted that block 701 is not needed in embodiments that start out with an input signal that is bandlimited to frequencies below 2 kHz and sampled at 4 kHz.

The output signal from block 701 is supplied to a low band filter 703 and to a high band filter 705. The low band filter 703 may alternatively be a band pass filter or a low pass filter that passes the frequencies in the low band DTMF frequency group. The attenuation of frequencies in the high band frequency group should be at least 25 dB.

The high band filter 705 may alternatively be a band pass filter or a high pass filter that passes the frequencies in the high band DTMF frequency group. The attenuation of frequencies in the low band frequency group should be at least 25 dB.

The outputs from the low and high band filters 703 and 705 are respectively applied to first and second estimate acf values blocks 707 and 709. Each of these blocks 707 and 709 estimates the acf-values that correspond to a period of the actual input signal. This period is called a frame, and could be, for example, 9 ms. The estimation can be performed recursively by using equations (5) and (6). The factor λ is somewhere around 0.98. At each start of a new frame, the acf-values are initialized to zero.

The outputs from the first and second estimate acf values blocks 707 and 709 are then supplied to respective inputs of an analyze frame block 711. The frame analysis performed by this block comprises the following steps:

First, frequency testing is performed on both the low and high band signals. That is, an evaluation is made to determine whether equation (17) is fulfilled for any low band frequency, and whether equation (19) is fulfilled for any high band frequency. If this is the case, then the actual DTMF tone combination is registered, and processing proceeds to the next test. If the frequency test did not pass, then an output is generated that indicates "no DTMF signal", and the rest of the tests are skipped.

Next in block 711, a magnitude test of the low and high band signals is performed. Specifically, it is determined whether equation (21) is fulfilled in both the low and high bands. If the test passed, then an output is generated indicating the actual DTMF tone, and processing continues with the next calculation. Otherwise, an output is generated that indicates "no DTMF signal", and the rest of the calculations are skipped.

Next in block 711, the squared magnitude for the high band signal (or low band or both, depending on what is to be done in the "SPEECH TEST") is determined. This is done in accordance with equation (20), and the result is supplied in the frame result.

Next in block 711, a calculation of the frequency, represented by the angle θ, is performed for the high band signal (or low band or both depending on what is to be done in the "SPEECH TEST"). This calculation is performed in accordance with equation (10), and the result is supplied in the frame result.

Finally in block 711, the registered DTMF tone combination is supplied as an output.

The above-described frame results from block 711 are then supplied to an analyze sequence of frame results block 713. This block analyzes and registers a sequence of frame results and outputs a sequence result whenever it has detected a sequence of frame results that passes the criterion for being considered a valid DTMF pulse. The criterion is that there must be a sequence of at least P consecutive frame results that indicates the same DTMF. In this test, P is dependent on both the minimum length of a DTMF pulse that has to be detected and the frame length. The parameter P is application specific. For example, given a frame length of 9 ms and a minimum length of 36 ms, P is 4.

When the criterion is fulfilled, the sequence results are supplied as an output of block 713. The sequence results are:

the squared magnitude values (or frequency values) of all frames in sequence indicating the same DTMF; and the number of frames, N, indicating the same DTMF signal.

The output of block 713 is then supplied to a speech test block 715. Various techniques for performing the speech test have described above with reference to FIGS. 2–6, and are therefore not repeated here. It is noted, however, that because of requirements on the pause part in DTMF signaling (as mentioned earlier in this disclosure), a DTMF detector cannot rely solely on the output of the speech test block 715 as indicating whether or not a DTMF code is present. Instead, the DTMF detector must additionally check to ensure that the proper pause is detected either before or after the pulse part of the signal. The pause requirements are application-specific, and are therefore not set forth here in further detail.

The invention has been described with reference to a particular embodiment. However, it will be readily apparent to those skilled in the art that it is possible to embody the invention in specific forms other than those of the preferred embodiment described above. This may be done without departing from the spirit of the invention.

For example, the exemplary embodiments described above all involve performing tests on each of the low and high band signals. However, this is not a requirement. To the contrary, in alternative embodiments, the invention can be practiced by only performing the tests on the high band signal.

Thus, the preferred embodiment is merely illustrative and should not be considered restrictive in any way. The scope of the invention is given by the appended claims, rather than the preceding description, and all variations and equivalents which fall within the range of the claims are intended to be embraced therein.

What is claimed is:

1. A method of determining whether a received signal represents a dual tone multi frequency (DTMF) code, comprising the steps of:

repeatedly measuring a characteristic of the received signal over a period of time, thereby obtaining a plurality of parameter measurements;

determining a deviation value for each of the plurality of parameter measurements from a predefined constant;

determining an average deviation value from the plurality of deviation values;

comparing the average deviation value to a threshold value and thereby obtaining a comparison result; and designating the received signal as alternatively representing or not representing a DTMF code on the basis of the comparison result;

wherein the step of repeatedly measuring the characteristic of the received signal over a period of time, thereby obtaining a plurality of parameter measurements, comprises the steps of:

separating the received signal into low band and high band signals; and for each of the low band and high band signals, determining a plurality of squared magnitude measurements over the period of time, wherein each squared magnitude measurement corresponds to a distance between an origin and a pole in a z-plane.

2. The method of claim 1, wherein the pole is a complex conjugated pole that is derived from an all-pole filter.

3. The method of claim 1, wherein the step of determining a deviation value for each of the plurality of parameter measurements from a predefined constant comprises the step of:

for each of the plurality of squared magnitude measurements, determining a deviation from a predefined circle only if the squared magnitude measurement is less than the radius of the predefined circle, and setting the deviation equal to zero for all other cases.

4. The method of claim 3, wherein the predefined circle is a unit circle.

5. The method of claim 3, wherein the step of, for each of the plurality of squared magnitude measurements, determining the deviation from the predefined circle only if the squared magnitude measurement is less than the radius of the predefined circle, and setting the deviation equal to zero for all other cases comprises the steps of:

for each of the plurality of squared magnitude measurements, setting a corresponding one of a plurality of adjusted magnitude measurements equal to the squared magnitude measurement if the squared magnitude measurement is less than the radius of the predefined circle, and otherwise setting the corresponding one of the plurality of adjusted magnitude measurements equal to the radius of the predefined circle; and for each of the plurality of adjusted magnitude measurements, determining the deviation of the adjusted magnitude measurement from the predefined circle.

6. The method of claim 1, wherein the step of determining the average deviation value from the plurality of deviation values comprises the steps of:

determining which of the plurality of deviation values is a maximum deviation value; and determining an average deviation value from the plurality of deviation values not including the maximum deviation value.

7. An apparatus for determining whether a received signal represents a dual tone multi frequency (DTMF) code, comprising:

means for repeatedly measuring a characteristic of the received signal over a period of time, thereby obtaining a plurality of parameter measurements;

means for determining a deviation value for each of the plurality of parameter measurements from a predefined constant;

means for determining an average deviation value from the plurality of deviation values;

means for comparing the average deviation value to a threshold value and thereby obtaining a comparison result; and means for designating the received signal as alternatively representing or not representing a DTMF code on the basis of the comparison result;

wherein the means repeatedly measuring the characteristic of the received signal over a period of time, thereby obtaining a plurality of parameter measurements, comprises:

means for separating the received signal into low band and high band signals; and means for determining a plurality of squared magnitude measurements over the period of time for each of the low band and high band signals, wherein each squared magnitude measurement corresponds to a distance between an origin and a pole in a z-plane.

8. The apparatus of claim 7, wherein the pole is a complex conjugated pole that is derived from an all-pole filter.

9. The apparatus of claim 7, wherein the means for determining a deviation value for each of the plurality of parameter measurements from a predefined constant comprises:

means for determining a deviation from a predefined circle for each of the plurality of squared magnitude measurements only if the squared magnitude measurement is less than the radius of the predefined circle, and for setting the deviation equal to zero for all other cases.

10. The apparatus of claim 9, wherein the predefined circle is a unit circle.

11. The apparatus of claim 9, wherein the means for determining the deviation from the predefined circle for each of the plurality of squared magnitude measurements only if the squared magnitude measurement is less than the radius of the predefined circle, and for setting the deviation equal to zero for all other cases comprises:

means for setting a corresponding one of a plurality of adjusted magnitude measurements equal to the squared magnitude measurement for each of the plurality of squared magnitude measurements if the squared magnitude measurement is less than the radius of the predefined circle, and for otherwise setting the corresponding one of the plurality of adjusted magnitude measurements equal to the radius of the predefined circle; and means for determining the deviation of the adjusted magnitude measurement from the predefined circle for each of the plurality of adjusted magnitude measurements.

12. The apparatus of claim 7, wherein the means for determining the average deviation value from the plurality of deviation values comprises:

means for determining which of the plurality of deviation values is a maximum deviation value; and means for determining an average deviation value from the plurality of deviation values not including the maximum deviation value.

* * * * *